US011349638B2

(12) United States Patent
Cao et al.

(10) Patent No.: US 11,349,638 B2
(45) Date of Patent: May 31, 2022

(54) PRIVACY TRANSACTION PROCESSING METHOD, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Jingqi Cao, Beijing (CN); Silei Cheng, Beijing (CN); Lei Zhang, Beijing (CN); Xiaohe Liu, Beijing (CN); Haodong Chen, Beijing (CN); Hui Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 195 days.

(21) Appl. No.: 16/924,901

(22) Filed: Jul. 9, 2020

(65) Prior Publication Data
US 2021/0184835 A1    Jun. 17, 2021

(30) Foreign Application Priority Data
Dec. 13, 2019  (CN) .......................... 201911286121.6

(51) Int. Cl.
*G06F 21/62* (2013.01)
*H04L 9/06* (2006.01)
(Continued)

(52) U.S. Cl.
CPC ........ *H04L 9/0637* (2013.01); *G06F 21/6245* (2013.01); *H04L 9/0825* (2013.01);
(Continued)

(58) Field of Classification Search
CPC . G06F 21/6245; H04L 9/0637; H04L 9/0825; H04L 9/0869; H04L 2209/38
See application file for complete search history.

(56) References Cited

U.S. PATENT DOCUMENTS

| | | | |
|---|---|---|---|
| 2018/0343114 A1* | 11/2018 | Ben-Ari | H04L 9/302 |
| 2019/0164153 A1* | 5/2019 | Agrawal | G06Q 20/0658 |
| 2019/0279206 A1* | 9/2019 | Song | H04L 9/3239 |

OTHER PUBLICATIONS

Kosba et al., "Hawk: The Blockchain Model of Cryptography and Privacy-Preserving Smart Contracts", 2016, pp. 839-858 (Year: 2016).*

* cited by examiner

*Primary Examiner* — Thaddeus J Plecha
(74) *Attorney, Agent, or Firm* — Fay Sharpe LLP

(57) ABSTRACT

Embodiments of the present disclosure provide a privacy transaction processing method, an electronic device and a storage medium, and relates to a field of blockchain technologies. The method includes: obtaining a business transaction request to be executed; if the business transaction request is a privacy business transaction request, obtaining a corresponding privacy key, in which the privacy key is an organization privacy key of a privacy organization to which the privacy business transaction request belongs; decrypting and executing the privacy business transaction request according to the privacy key to generate privacy business transaction data, in which the privacy business transaction data comprises at least associated information of privacy content data and the privacy business transaction request; and storing the privacy business transaction data in a blockchain, and storing the privacy content data locally.

20 Claims, 4 Drawing Sheets

(51) Int. Cl.
 *H04L 9/32* (2006.01)
 *H04L 9/08* (2006.01)
(52) U.S. Cl.
 CPC .......... *H04L 9/0869* (2013.01); *H04L 9/3236* (2013.01); *H04L 2209/38* (2013.01)

PRIVACY TRANSACTION PROCESSING METHOD, ELECTRONIC DEVICE AND STORAGE MEDIUM

CROSS-REFERENCE TO RELATED APPLICATION

The present application is based upon and claims priority to Chinese Patent Application No. 201911286121.6, filed on Dec. 13, 2019, the entirety contents of which are incorporated herein by reference.

TECHNICAL FIELD

The present disclosure relates to a field of computer technologies, specifically a field of blockchain technologies, and more particularly, to a privacy transaction processing method, an electronic device and a medium.

BACKGROUND

Usually, a traditional distributed computing environment may be able to handle single points of failure, instead of malicious behaviors. The malicious behaviors of any node make the entire distributed computing environment unusable. The development of blockchain technologies solves this problem and realizes requirements for secure interaction in an untrusted distributed computing environment.

Normally, in a distributed computing environment built by blockchain technologies, the data is public, data disclosure is acceptable. However, in some occasions, there is also a requirement to protect data privacy.

SUMMARY

Embodiments of the present disclosure provide a privacy transaction processing method, an electronic device and a medium.

Embodiments of the present disclosure provide a privacy transaction processing method executable by blockchain nodes, the method includes: obtaining a business transaction request to be executed; if the business transaction request is a privacy business transaction request, obtaining a corresponding privacy key, in which the privacy key is an organization privacy key of a privacy organization to which the privacy business transaction request belongs; decrypting and executing the privacy business transaction request according to the privacy key to generate privacy business transaction data, in which the privacy business transaction data includes at least associated information of privacy content data and the privacy business transaction request; and storing the privacy business transaction data in a blockchain, and storing the privacy content data locally.

Embodiments of the present disclosure provide an electronic device, which includes: one or more processors; a memory connected in communication with the one or more processors, in which the memory stores instructions executable by the one or more processors, when the instructions are executed by the one or more processors, the one or more processors are configured to: obtain a business transaction request to be executed; if the business transaction request is a privacy business transaction request, obtain a corresponding privacy key, in which the privacy key is an organization privacy key of a privacy organization to which the privacy business transaction request belongs; decrypt and execute the privacy business transaction request according to the privacy key to generate privacy business transaction data, in which the privacy business transaction data includes at least associated information of privacy content data and the privacy business transaction request; store the privacy business transaction data in a blockchain, and store the privacy content data locally.

Embodiments of the present disclosure provide a non-transitory computer-readable storage medium storing computer instructions, when the computer instructions are executed, the computer is caused to implement a privacy transaction processing method. The method includes: obtaining a business transaction request to be executed; if the business transaction request is a privacy business transaction request, obtaining a corresponding privacy key, in which the privacy key is an organization privacy key of a privacy organization to which the privacy business transaction request belongs; decrypting and executing the privacy business transaction request according to the privacy key to generate privacy business transaction data, in which the privacy business transaction data includes at least associated information of privacy content data and the privacy business transaction request; and storing the privacy business transaction data in a blockchain, and storing the privacy content data locally.

Additional effects of the foregoing optional manner are described below in combination with specific embodiments.

BRIEF DESCRIPTION OF THE DRAWINGS

The accompanying drawings are used to better understand the solution, and do not constitute a limitation on the present disclosure, in which.

DETAILED DESCRIPTION

The following describes the exemplary embodiments of the present disclosure with reference to the accompanying drawings, which includes various details of the embodiments of the present disclosure to facilitate understanding, which shall be considered merely exemplary. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

Embodiment 1

Figure 1:
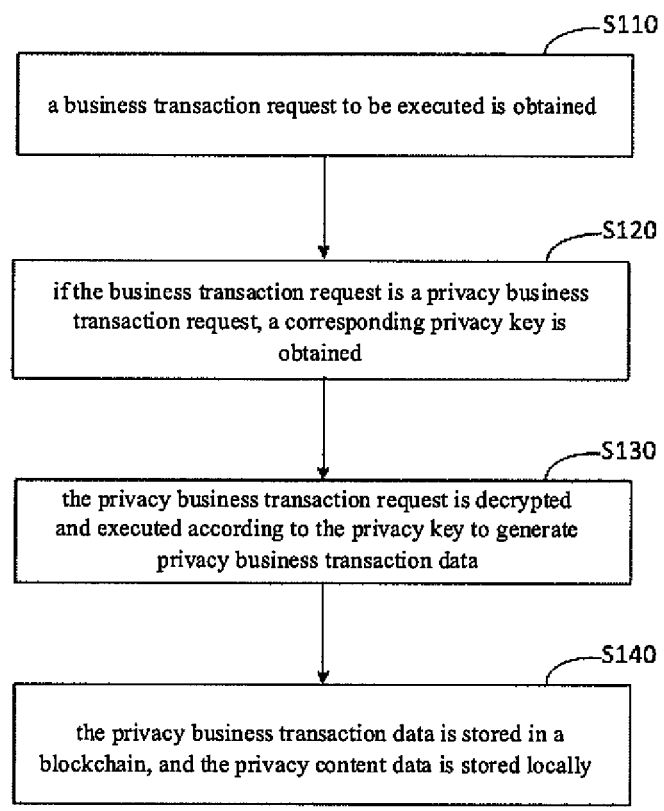
FIG. 1 is a flowchart of a privacy transaction processing method according to Embodiment 1 of the present disclosure.

FIG. 1 is a flowchart of a privacy transaction processing method according to Embodiment 1 of the present disclosure. This embodiment is applicable for a case of implementing privacy transaction processing based on blockchains, and more particularly for a case of satisfying requirements of protecting node data privacy in a scenario where a blockchain network is a consortium blockchain. The privacy transaction processing method in this embodiment may be executed by blockchain nodes. This method is executed by the privacy transaction processing apparatus, which is implemented in software and/or hardware, and integrated into a computing device that carries blockchain nodes. As illustrated in FIG. 1, the privacy transaction processing method according to this embodiment may include the following steps.

At step S110, a business transaction request to be executed is obtained.

In this embodiment, the business transaction request may be an unprocessed transaction request based on a smart contract, which is obtained by the local node from the blockchain network, or a transaction request based on field formats.

Optionally, when a node in the blockchain network determines that a business transaction processing requirement is generated locally, or receives a business transaction processing requirement sent by a trigger mechanism such as a third-party device (e.g., a client, a terminal device, or a server), the business transaction request may be a request generated to request nodes other than the node in the blockchain network to process a certain transaction.

In detail, after generating a business transaction request, each of the nodes in the blockchain network transmits the business transaction request to the blockchain network, and then the local nodes obtain the business transaction request to be executed from the blockchain network.

Further, in this embodiment, processing the business transaction request transmitted in the blockchain network may be performed in stages. For example, after generating a business transaction request, a node A transmits the business transaction request to the blockchain network, and then the nodes in the blockchain network store the business transaction request on the blockchain based on consensus mechanism, and further the local node may obtain the business transaction request to be executed from the blockchain.

At S120, if the business transaction request is a privacy business transaction request, a corresponding privacy key is obtained.

In this embodiment, from the perspective of privacy protection requirements, the business transaction requests transmitted in the blockchain network are of two types, i.e., privacy business transaction request and ordinary business transaction request. The ordinary business transaction request may be a business transaction request that does not include privacy content. On the contrary, the privacy business transaction request is a business transaction request that includes privacy content. In order to distinguish the ordinary business transaction request and the privacy business transaction request, further, identification information such as specific identifiers or names of privacy organization to which the request belongs may be added to the privacy business transaction request. For example, the privacy business transaction request may be a privacy business transaction request including encrypted privacy content and names of privacy organizations initiated when the nodes in the privacy organizations has privacy requirements, and after the privacy content is encrypted the organization privacy key of the privacy organization to which the request belongs.

The privacy organization refers to a set of nodes in the blockchain network used to process a certain or some privacy business transaction requests. Optionally, one node may belong to different privacy organizations, and different privacy organizations may process different privacy business transaction requests. Further, the privacy content included in the privacy business transaction request is visible to the nodes in the privacy organization to which the request belongs, but invisible to nodes outside the privacy organization.

The organization key refers to a privacy key used by each node in the privacy organization to encrypt the private content to be protected. Optionally, different privacy organizations may have different organization keys, in which each organization key is generated by the initiator of the privacy organization and distributed to other nodes in the privacy organization, or generated by nodes with high transaction processing efficiency in the privacy organization and distributed to other nodes in the privacy organization. In order to protect the security of the organization key to ensure the security of the private data, the organization key is further stored in a local privacy state database of each node in the privacy organization. The privacy state database is relative to a public state database, the privacy state database stores associations between the organization keys and the organization names, and the privacy content data. The public state database is configured to store data generated by the execution of the ordinary business transaction requests. In this embodiment, the privacy key is the organization privacy key of the privacy organization to which the privacy business transaction request belongs.

In detail, after the local node obtains the business transaction request to be executed, if it is determined that the business transaction request includes identification information such as the name of the privacy organization, the business transaction request is determined as belonging to the privacy business transaction request, and further the organization privacy key of the privacy organization is obtained from the local privacy state database according to the identified name of the privacy organization, and the organization privacy key is determined as the privacy key.

Since the organization privacy key is stored in the local privacy state database of each node in the privacy organization, the organization privacy key is obtained only when the local node belongs to a node in the privacy organization. For example, obtaining the corresponding privacy key may include: determining whether a local node is within the privacy organization to which the privacy business transaction request belongs, if the local node is within the privacy organization to which the privacy business transaction request belongs, the local node obtains the organization privacy key of the privacy organization from the local privacy state database. Further, if the local node is not a node within the privacy organization to which the privacy business transaction request belongs, the organization privacy key cannot be obtained, and execution on the business transaction request is skipped.

At step S130, the privacy business transaction request is decrypted and executed according to the privacy key to generate privacy business transaction data.

In this embodiment, the privacy business transaction data includes at least the associated information of the privacy content data and the privacy business transaction request. The associated information of the private content data refers to the information indicating the uniqueness of the private content data. Optionally, the manner in which the private content data is processed determines the associated information of the private content data. For example, the associated information of the private content data may be a hash value obtained by performing hash operation on the privacy content data, or encrypted data obtained by encrypting the privacy content data by using the organization privacy key or other encrypting algorithms. The associated information of the private content data may also be encrypted data obtained by first performing hash operation on the private content data, and then encrypting the hash value obtained by the hash operation by using the organization privacy key.

In detail, after acquiring the corresponding privacy key, the local node may use the privacy key to decrypt the privacy business transaction request, and then execute the decrypted privacy business transaction request to generate the associated information including at least associated information of the privacy content data and the privacy business transaction data of the privacy business transaction request.

At step S140, the privacy business transaction data is stored in a blockchain, and the privacy content data is stored locally.

Optionally, in order to protect the privacy content data, the local node may store the privacy content data in the local privacy state database. Meanwhile, in order to reduce the probability that the private content data has been tampered with, the local node can associate the associated information of the private content data and the privacy business transaction request and store the associated information of the private content data and the privacy business transaction request in the blockchain. In addition, after the associated information of the privacy content data is generated, the associated information of the privacy content data is sent to the blockchain network, so that other nodes (including nodes outside the privacy organization) in the blockchain network associate the associated information of the privacy content data and the privacy business transaction request and stores the associated information of the privacy content data and the privacy business transaction request in the blockchain, thereby ensuring the consistency of the blockchain data.

Further, in the case where the processing of the business transaction request transmitted in the blockchain network is performed in stages, if it is considered whether the privacy content data has been tampered with, since the privacy business transaction request has been stored in the block in order to reduce load pressure of the blockchain, when the local node completes the privacy business transaction request, the identifiers of the privacy business transaction requests and the associated information of the privacy content data are associated and stored together in the blockchain, meanwhile the privacy content data is stored in a local privacy state database.

In a condition of not considering whether the privacy content data is tampered with, the local node can directly store the privacy content data in the local privacy state database after executing the privacy business transaction request.

It is noted that, compared to the manner in which the privacy data is transmitted respectively in the organization through additional off-chain transmission components, and compared to the manner in which the privacy transaction is performed by building a privacy channel (such as Hyperledger Fabric), in the present disclosure, additional transmission component is not required to be introduced, and the privacy channel is not needed to be built. By using the organization privacy key to encrypt the privacy business transaction request and upload the request on the chain, the privacy characteristics of the data is ensured and the uncertainty caused by off-chain transmission of the privacy data is avoided. Meanwhile, the cost of executing the privacy transactions in the blockchain network is reduced.

In the technical solution according to the embodiments of the present disclosure, after determining that the business transaction request to be executed belongs to a privacy business transaction request, the blockchain nodes decrypt the privacy business transaction request by using the organization privacy key of the privacy organization to which the acquired privacy business transaction request belongs. Afterwards, the decrypted privacy business transaction request is executed to generate the privacy business transaction data including at least the associated information of the privacy content data and the privacy business transaction request, the privacy business transaction data is stored in the blockchain, and the privacy content data is stored locally. While ensuring the security of the private data content, the private data content is prevented from being tampered with. The present disclosure does not need to introduce additional transmission components. By using the organization key to encrypt the private business transaction request and upload the private business transaction request on the chain, the privacy characteristics of the data is guaranteed and the uncertainty of the transmission of the private data chain is avoided so that a low-cost, high security, and high flexibility in the implementation of privacy transactions in the blockchain network is realized.

Embodiment 2

Figure 2:
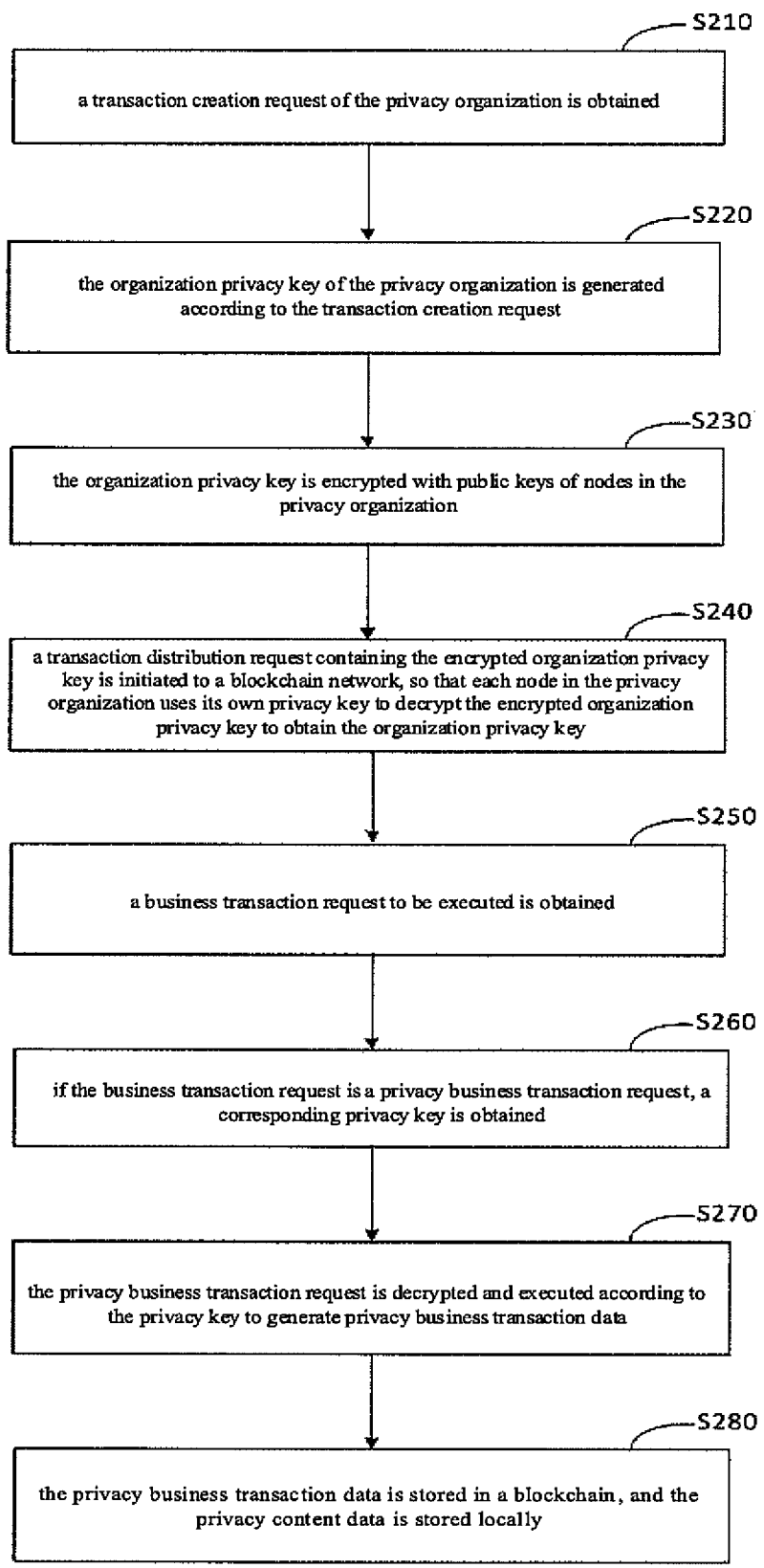
FIG. 2 is a flowchart of a privacy transaction processing method according to Embodiment 2 of the present disclosure.

FIG. 2 is a flowchart of a privacy transaction processing method according to Embodiment 2 of the present disclosure. This embodiment adds the process of creating and producing an organization privacy key by a privacy organization on the basis of the foregoing embodiment. As illustrated in FIG. 2, the privacy transaction processing method according to this embodiment may include the following steps.

At step S210, a transaction creation request of the privacy organization is obtained.

In this embodiment, the local node may receive a transaction creation request of a privacy organization initiated by a node in the blockchain network, or initiated locally. For example, the local node obtains the privacy organization transaction creation request in at least one of the following ways.

In a first way, if there is a requirement for creating privacy transaction, the transaction creation request of the privacy organization is initiated, in which the privacy transaction requirements may be generated when the local node has a requirement for privacy transaction (such as privacy business).

In a second way, based on the privacy organization creation rules stored in a historical block, the transaction creation request of the privacy organization is initiated, in which the privacy organization creation rules refer to the conditions that need to be met to create a privacy organization. Optionally, in the privacy organization creation rules, the number of nodes participating in the organization is not less than two, and types of business transactions that belong to the privacy business transaction are illustrated. Further, the privacy organization creation rules may be written into the blocks as transaction data in the form of smart contracts or other forms approved by the blockchain network. In detail, the local node may traverse historical blocks to obtain the privacy organization creation rules, or the historical blocks store the privacy organization creation rules, and trigger notification mechanism are set to notify the blockchain node to query the privacy organization creation rules. When the local node recognizes that the locally generated business transaction requirements meet the privacy organization creation rules stored in the historical blocks, the privacy organization transaction creation request is initiated.

In a third way, if it is recognized that the business transaction requirements meet the privacy organization creation rules in the local deployment data, a privacy organization transaction creation request is initiated. The local deployment data refers to the operating rules of the deployed blockchain network when the local node participates in the blockchain network. The local deployment data may include the privacy organization creation rules, issuance mechanisms, and reward and punishment mechanisms. It is noted that the local deployment data is stored locally in the local node, and may also be stored in a genesis block.

In a fourth way, the transaction creation request of the privacy organization initiated by a node in real time is received.

In this embodiment, the transaction creation request of the privacy organization may include the name of the privacy organization to be created, and all information of the nodes participating in the privacy organization such as the node public key or node ID, and designated organization privacy key generation rules.

At step S220, the organization privacy key of the privacy organization is generated according to the transaction creation request.

Optionally, if the local node is the initiator of the transaction creation request of the privacy organization, and then the local node may generate the organization privacy key according to the organization privacy key generation rules, if it is determined that the privacy organization has been successfully created according to the transaction creation request. Determining that the privacy organization has been successfully created according to the transaction creation request may be that the local node obtains the consent notification of nodes other than the local node in the transaction creation request. Organization privacy key generation rules refer to the conditions required to generate an organization privacy key, which may include the format of the organization privacy key. Optionally, the organization privacy key in this embodiment may be composed of a version number and a random number. The version number may be a serial number.

If the local node is not the initiator of the transaction creation request of the privacy organization, but belongs to the node within the privacy organization, for example, the node with the highest transaction processing efficiency, the organization privacy key may also be generated according to the organization privacy key generation rules specified in the transaction creation request.

In order to ensure that the privacy business transaction request in the privacy organization is safely and stably executed, optionally, after the organization privacy key of the privacy organization is generated, the organization privacy key is sent to a supervision node that supervises the privacy organization, to cause the supervision node to supervise the privacy business transaction request in the privacy organization.

In this embodiment, different privacy organizations perform different privacy transactions, and thus different privacy organizations may have different supervision nodes. In detail, after generating the organization privacy key, the local node sends the organization privacy key to the supervision node that supervises the privacy organization, and the supervision node supervises the privacy business transaction request in the privacy organization.

Further, the local node may directly include the supervision node when creating the privacy organization, so that the supervision node supervises the privacy business transaction request in the privacy organization.

It should be noted that by introducing the supervision node, effective supervision of the privacy business transaction requests transmitted in the blockchain network is achieved, thereby not only ensuring the security of privacy data, but also making the blockchain network operate safely and stably.

At step S230, the organization privacy key is encrypted with public keys of nodes in the privacy organization.

In detail, after the local node generates the organization privacy key, the public key of the nodes in the privacy organization may be used to encrypt the organization privacy key to obtain the encrypted organization key.

At step S240, a transaction distribution request containing the encrypted organization privacy key is initiated to a blockchain network, so that each node in the privacy organization uses its own privacy key to decrypt the encrypted organization privacy key to obtain the organization privacy key.

In this embodiment, the transaction distribution request may be a request generated when the local node is used to transfer the organization privacy key to other nodes in the privacy organization. Optionally, the transaction distribution request may include the encrypted organization key and the name of the privacy organization.

In detail, after the local node encrypts the organization privacy key using the public key of each node in the privacy organization, a transaction distribution request including the encrypted organization privacy key is initiated to the blockchain network. Furthermore, the nodes in the blockchain network obtain the transaction distribution request from the blockchain network, and store the business transaction request in the blockchain based on the consensus mechanism. Then, if other nodes in the blockchain network determine that they belong to the same privacy organization as the local node, the private key that belong to itself is used to decrypt the encrypted organization privacy key to obtain the organization privacy key; if it is determined that the other nodes in the blockchain network do not belong to the privacy organization to which the local node belongs, the execution on the transaction distribution request is skipped.

Further, after initiating a transaction distribution request including the encrypted organization privacy key to the blockchain network, or after each node in the privacy organization conducts privacy business transaction interactions for several times, if the local node determines that the current state meets the new key generation conditions, the current version number of the organization privacy key is determined, and the new version number is generated according to the set numbering rules, and the new organization privacy key is generated according to the new version number and the random number.

In this embodiment, the current state refers to the current state of the privacy organization, and may include at least one of the current time, the current version of the organization key usage status, and change of the nodes within the organization. The current time refers to the current local time of the local node. The change of the nodes in the organization may include, but is not limited to, change of the number of nodes in the organization, and change of the node identification. The current version of the organization key usage status may include, but is not limited to, whether the current version of the organization privacy key is leaked. The new key generation conditions refer to the conditions of generating the new version, that is, the next version of the organization privacy key. For example, the condition of generating the new privacy key includes at least one of: 1) a current time reaching a preset privacy key update time; 2) a number and/or identifiers of the nodes in the privacy organization changing, and 3) the organization privacy key with the current version number suffering from a leakage event. The preset privacy key update time refers to a preset fixed time point or time period for updating the organization privacy key, for example, every 10 minutes, or in an hour. The node identifier is an identifier used to uniquely identify the node, which may be the public key or ID of the node. The leakage event may be the event triggered when the organization privacy of the current version is notified to nodes outside of the privacy organization, or the event triggered when the organization privacy of the current version is leaked when a node in the privacy organization is invaded by external things.

The setting numbering rule refers to a preset rule for determining the version number. Optionally, the setting numbering rule may direct to serial numbers. Therefore, the new version number, that is, the next version number, may be the current version number by subtracting or adding a preset integer value such as adding 1 or subtracting 1.

If the local node recognizes that the difference between the current time minus the update time of the previous version of the organization key is equal to 10 minutes, it is determined that the current state meets the new privacy key generation condition. Or, if the local node recognizes that the number of nodes in the privacy organization has changed such as the number of nodes has increased or decreased, it is determined that the current state meets the new privacy key generation condition. It may also be that if the local node detects a leakage event of the current version of the organization privacy key, it may be determined that the current state meets the new privacy key generation condition. Optionally, if the local node determines that the current state meets the new privacy key generation condition, the current version number is read from the organization privacy key, and then the current version number is added by 1 to obtain the new version number, i.e., the next version number, meanwhile, a new random number can be randomly generated according to a local random number generation rule, and then a new organization privacy key is generated by the new version number and the newly generated random number.

Optionally, multiple different versions of the organization privacy key existing in the privacy organization are valid, and any node in the privacy organization may use any version of the organization key to issue a privacy business transaction request. Preferably, the latest version of the organization privacy key is used. It should be noted that this disclosure not only increases the security and flexibility of the organization key management by adding the version number to the organization privacy key, but also facilitates the subsequent quick inquiry of the previous privacy business transaction request by the version number.

At step S250, a business transaction request to be executed is obtained.

At step S260, if the business transaction request is a privacy business transaction request, a corresponding privacy key is obtained.

At step S270, the privacy business transaction request is decrypted and executed according to the privacy key to generate privacy business transaction data.

At step S280, the privacy business transaction data is stored in a blockchain, and the privacy content data is stored locally.

The technical solution according to the embodiments of the present disclosure does not require the introduction of a centralized CA node. By transmitting the transaction distribution request including the encrypted organization privacy key in the blockchain network, not only the security of the organization privacy key is guaranteed, Moreover, each node in the privacy organization obtains the organization privacy key, which provides a new way for the nodes in the privacy organization to obtain the organization privacy key through the chain.

Embodiment 3

Figure 3:
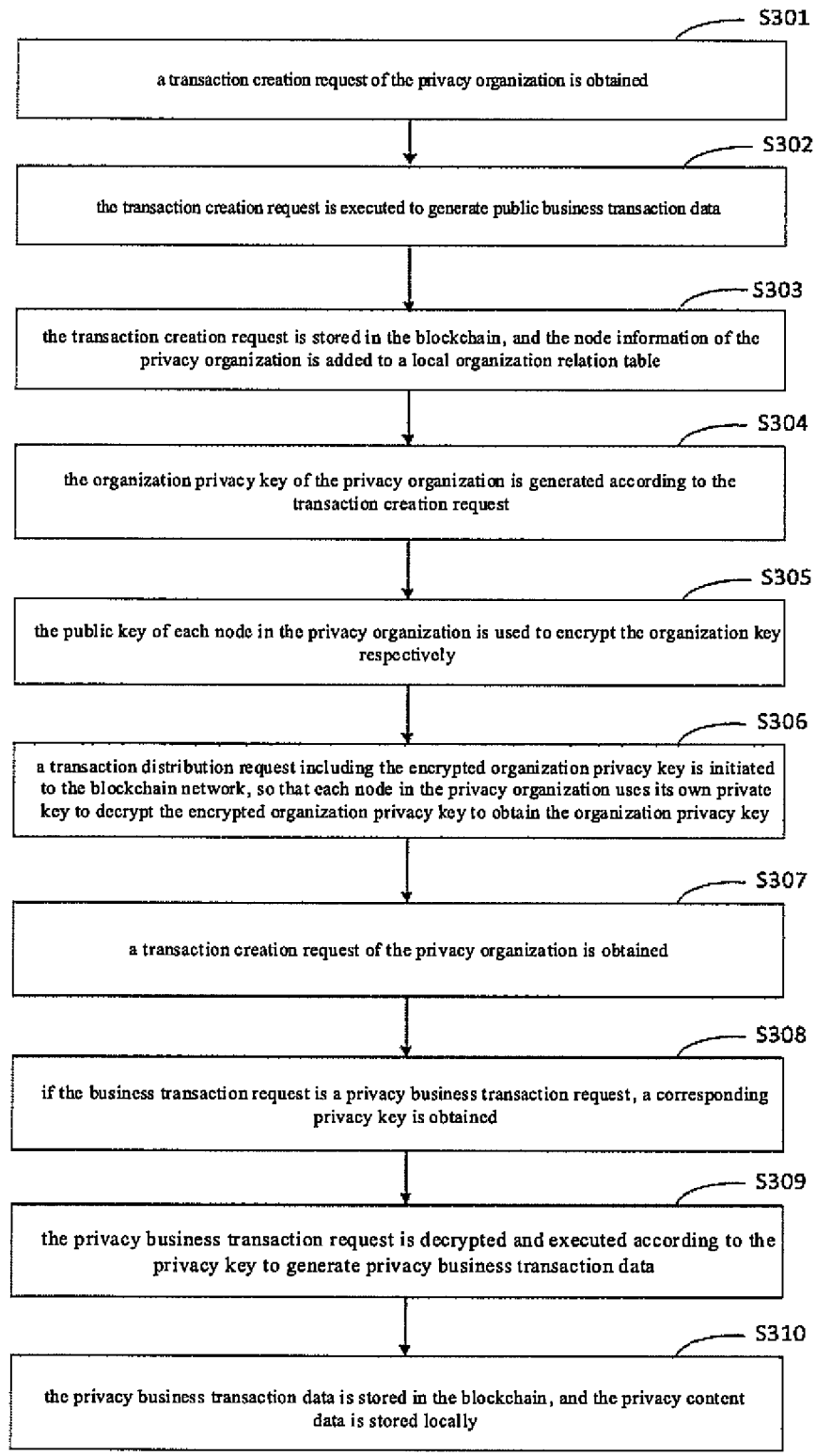
FIG. 3 is a flowchart of a privacy transaction processing method according to Embodiment 3 of the present disclosure.

FIG. 3 is a flowchart of a privacy transaction processing method according to Embodiment 3 of the present disclosure. This embodiment includes a privacy organization management process on the basis of the foregoing embodiments. As illustrated in FIG. 3, the privacy transaction processing method in this embodiment may include the following steps.

At step S301, a transaction creation request of the privacy organization is obtained.

At step S302, the transaction creation request is executed to generate public business transaction data.

Optionally, regardless of whether the local node is a node within the privacy organization, after obtaining the transaction creation request of the privacy organization, the transaction creation request may be executed to generate the public business transaction data. The public business transaction data includes at least the transaction creation request and the public content data, and the public content data includes node information in the privacy organization. The node information may include a node public key or a node ID.

At step S303, the transaction creation request is stored in the blockchain, and the node information of the privacy organization is added to a local organization relation table.

In this embodiment, the organization relation table may include the association relation between the name of the privacy organization and the node information in the privacy organization. Further, the organization relation table may be stored in the public state database of the local node.

In detail, after executing the transaction creation request and generating the public business transaction data, in order to reduce the load on the blockchain, the local node stores the transaction creation request in the blockchain and adds the node information in the privacy organization to the local organization relation table.

It should be noted that in this embodiment, the processing of the transaction creation request transmitted in the blockchain network may also be performed in stages. For example, if a local node generates a privacy transaction requirement, it initiates a transaction creation request of the privacy organization to the blockchain network. The node in the blockchain network stores the transaction creation request on the blockchain based on the consensus mechanism. Afterwards, the nodes in the blockchain network, including local nodes, may execute the transaction creation request, generate public business transaction data, and directly add the node information in the private organization in the public business transaction data to the local organization relation table.

Further, in order to reduce the probability of the local node tampering with the transaction data, the local node may store the transaction creation request in the public business transaction data and the node information in the privacy organization together on the blockchain.

Optionally, after creating a privacy organization, for example, after obtaining a transaction creation request of a privacy organization, or after each node in the privacy organization performs multiple privacy business transaction interactions, any node in the privacy organization may exit the privacy organization based on actual requirements, and then, the local node may receive the transaction exit request of the privacy organization initiated by the node in the privacy organization. The transaction exit request is executed, and the node information in the local organization relation table is updated according to the execution result of the transaction exit request. The transaction exit request may be initiated by a node in the privacy organization according to actual requirements, and is used to exit the privacy organization. Optionally, the transaction exit request may include the name of the privacy organization to be exited, and the node identifier such as the node public key.

In detail, regardless of whether the local node is a node in the privacy organization, after receiving the transaction exit request of the privacy organization initiated by any node in the privacy organization, the transaction exit request is executed and the execution of the transaction exit request is performed. As a result, the node is deleted from the privacy organization to which the node belongs in the local organization relation table according to the execution result of the transaction exit request.

It should be noted that the processing of the transaction exit request transmitted in the blockchain network may also be performed in stages. Optionally, if the local node is a node in a privacy organization, when the local node needs to quit any privacy organization to which it belongs, the local node initiates an transaction exit request including the name of the privacy organization and the node identification, and then the nodes in the blockchain network store the transaction exit request on the blockchain based on the consensus mechanism, and then other nodes (including other nodes in the privacy organization and nodes outside the privacy organization) execute the transaction exit request and delete the local node from the privacy organization to which the node belongs in the local organization relation table according to the execution result of the transaction exit request.

For example, after a privacy organization is created, for example, it may be after obtaining a transaction creation request of a privacy organization, or after each node in the privacy organization conducts multiple privacy business transaction interactions, when the local node is a node in the privacy organization, if the local node recognizes that any node in the privacy organization is a problematic node, it initiates a transaction deletion request of the privacy organization, so that other nodes in the privacy organization delete the problematic node from the local organization relation table. The problematic node may be a node that leaks the organization privacy key in the privacy organization, or a node with poor stability in the privacy organization. The transaction deletion request is initiated by any node in the privacy organization, such as when the initiator recognizes that there is a problematic node in the privacy organization, and is used to request other nodes in the privacy organization to delete the problematic node. Optionally, the transaction deletion request includes the name of the privacy organization to which the problematic node to be removed belongs, and the node identifier of the problematic node, such as the node public key.

In detail, if the local node recognizes that any node in the privacy organization is the problematic node, it can initiate a transaction deletion request of the privacy organization, and then the nodes in the blockchain network store the transaction deletion request based on the consensus mechanism in Blockchain. After that, other nodes (including other nodes in the privacy organization and nodes outside the privacy organization) execute the transaction deletion request, and remove the problematic node from the privacy organization to which it belongs in the local organization relation table according to the execution result of the transaction deletion request.

It should be noted that after the creation of the privacy organization, each node in the privacy organization may exit the organization according to actual requirements, further increasing the flexibility of organization management. Meanwhile, the identification function of the problematic node is added, and the safety of the privacy data is further ensured.

At step S304, the organization privacy key of the privacy organization is generated according to the transaction creation request.

At step S305, the public key of each node in the privacy organization is used to encrypt the organization key respectively.

At step S306, a transaction distribution request including the encrypted organization privacy key is initiated to the blockchain network, so that each node in the privacy organization uses its own private key to decrypt the encrypted organization privacy key to obtain the organization privacy key.

At step S307, a transaction creation request of the privacy organization is obtained.

At step S308, if the business transaction request is a privacy business transaction request, a corresponding privacy key is obtained.

At step S309, the privacy business transaction request is decrypted and executed according to the privacy key to generate privacy business transaction data.

At step S310, the privacy business transaction data is stored in the blockchain, and the privacy content data is stored locally.

The technical solution according to the embodiments of the present disclosure, by setting the organization relation table, is convenient for intuitive management and understanding of the changes of the nodes in the privacy organization. In addition, after the privacy organization is created, each node in the privacy organization may exit the organization according to actual requirements, further increasing the flexibility of organization management, and meanwhile increasing the identification function of the problematic node, and further ensuring the security of the private data.

Embodiment 4

Figure 4:
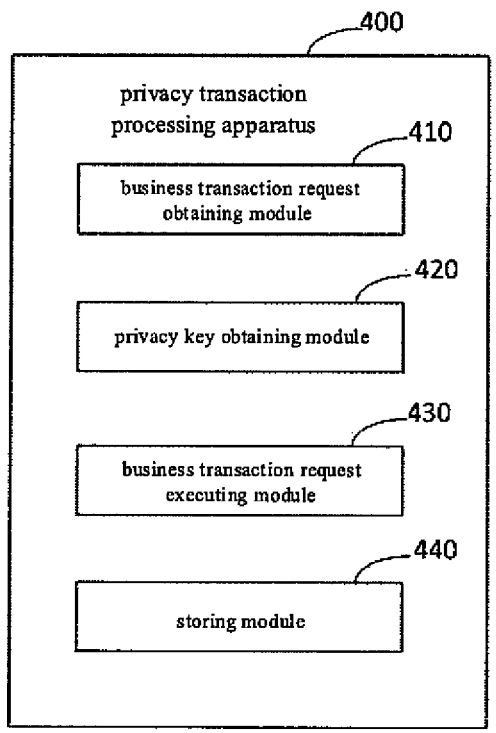
FIG. 4 is a schematic diagram of a privacy transaction processing apparatus according to Embodiment 4 of the present disclosure.

FIG. 4 is a schematic diagram of a privacy transaction processing apparatus 400 according to Embodiment 4 of the present disclosure. The apparatus may be configured in blockchain nodes, and execute the privacy transaction processing method according to any embodiment of the present disclosure and has corresponding function modules and beneficial effects of the execution method. As illustrated in FIG. 4, the privacy transaction processing apparatus includes: a business transaction request obtaining module 410, a privacy key obtaining module 420, a business transaction request executing module 430, and a storing module 440.

The business transaction request obtaining module 410 is configured to obtain a business transaction request to be executed.

The privacy key obtaining module 420 is configured to, if the business transaction request is a privacy business transaction request, obtain a corresponding privacy key, wherein the privacy key is an organization privacy key of a privacy organization to which the privacy business transaction request belongs.

The business transaction request executing module 430 is configured to decrypt and execute the privacy business transaction request according to the privacy key to generate privacy business transaction data, wherein the privacy business transaction data comprises at least associated information of privacy content data and the privacy business transaction request.

The storing module 440 is configured to store the privacy business transaction data in a blockchain, and store the privacy content data locally.

In the technical solution according to the embodiments of the present disclosure, after determining that the business transaction request to be executed belongs to a privacy business transaction request, the blockchain nodes decrypt the privacy business transaction request by using the organization privacy key of the privacy organization to which the acquired privacy business transaction request belongs. Afterwards, the decrypted privacy business transaction request is executed to generate the privacy business transaction data including at least the associated information of the privacy content data and the privacy business transaction request, the privacy business transaction data is stored in the blockchain, and the privacy content data is stored locally. While ensuring the security of the private data content, the private data content is prevented from being tampered with. The present disclosure does not need to introduce additional transmission components. By using the organization key to encrypt the private business transaction request and upload the private business transaction request on the chain, the privacy characteristics of the data is guaranteed and the uncertainty of the transmission of the private data chain is avoided so that a low-cost, high security, and high flexibility in the implementation of privacy transactions in the blockchain network is realized.

For example, the associated information of the privacy content data is a hash value obtained by performing hash operation on the privacy content data, or encrypted data obtained by encrypting the privacy content data by using the organization privacy key.

For example, the privacy key obtaining module 420 is configured to:

determine whether a local node is within the privacy organization to which the privacy business transaction request belongs; and if yes, obtain the corresponding privacy key.

For example, the apparatus further includes:

an operation skip module, configured to, when the privacy key obtaining module 420 determining that the local node is not within the privacy organization to which the privacy business transaction request belongs, skip execution on the business transaction request.

For example, the apparatus further includes:

a transaction creation request obtaining module, configured to obtain a transaction creation request of the privacy organization;

an organization privacy key generation module, configured to generate the organization privacy key of the privacy organization according to the transaction creation request;

an encrypting module, configured to encrypt the organization privacy key with public keys of nodes in the privacy organization; and a transaction distribution request initiating module, configured to initiate a transaction distribution request containing the encrypted organization privacy key to a blockchain network, so that each node in the privacy organization uses its own privacy key to decrypt the encrypted organization privacy key to obtain the organization privacy key.

For example, the transaction creation request obtaining module is configured to perform at least one of:

if there is a requirement for creating privacy transaction, initiating the transaction creation request of the privacy organization; and based on privacy organization creation rules stored in a historical block, initiating the transaction creation request of the privacy organization.

For example, the apparatus further includes:

a transaction creation request executing module, configured to after obtaining the transaction creation request of the privacy organization, execute the transaction creation request to generate public business transaction data, in which the public business transaction data contains at least the transaction creation request and public content data, and the public content data contains node information of the privacy organization; in which the storing module 440 is further configured to store the public business transaction data in the blockchain; or, the storing module 440 is further configured to store the transaction creation request in the blockchain, and adding the node information of the privacy organization to a local organization relation table.

For example, the apparatus further includes: a transaction exit request receiving module, configured to receive a transaction exit request of the privacy organization initiated by a node in the privacy organization; and a node information updating module, configured to execute the transaction exit request to obtain an execution result, and update the node information in the local organization relation table according to the execution result.

For example, the apparatus further includes: a transaction deletion request initiating module, configured to if a node in the privacy organization is identified as a problem node, initiate a transaction deletion request of the privacy organization, so that nodes other than the node in the privacy organization delete the problem node from the local organization relation table.

For example, the organization privacy key is composed of a version number and a random number.

For example, the apparatus further includes: a new version number generating module, configured to if it is determined that a current state of the privacy organization meets a condition of generating a new privacy key, determine a current version number of the organization privacy key, and generate a new version number according to set numbering rules; and an organization privacy key generating module, configured to generate a new organization privacy key based on the new version number and the random number.

For example, the new version number generating module is configured to when the condition of generating the new privacy key is met, execute at least one of: a current time reaching a preset privacy key update time; a number and/or identifiers of the nodes in the privacy organization changing, and the organization privacy key with the current version number suffering from a leakage event.

For example, the apparatus further includes:

an organization privacy key sending module, configured to send the organization privacy key to a supervision node that supervises the privacy organization, so that the supervision node supervises the privacy business transaction request in the privacy organization.

According to the embodiments of the present disclosure, the present disclosure also provides an electronic device and a readable storage medium.

Figure 5:
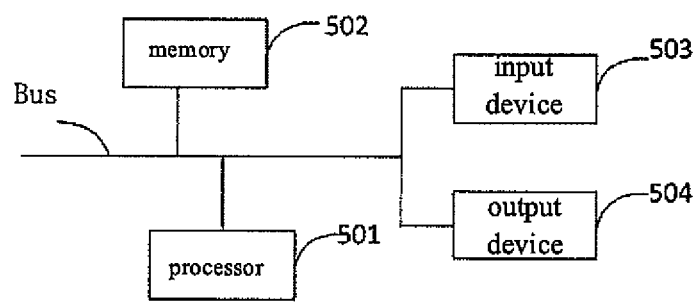
FIG. 5 is a block diagram of an electronic device used to implement the privacy transaction processing method according to an embodiment of the present disclosure.

FIG. 5 is a block diagram of an electronic device used to implement the privacy transaction processing method according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 5, the electronic device includes: one or more processors 501, a memory 502, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 501 is taken as an example in FIG. 5.

The memory 502 is a non-transitory computer-readable storage medium according to the present disclosure. The memory stores instructions executable by at least one processor, so that the at least one processor executes the voice control method according to the present disclosure. The non-transitory computer-readable storage medium of the present disclosure stores computer instructions, which are used to cause a computer to execute the privacy transaction processing method according to the present disclosure.

As a non-transitory computer-readable storage medium, the memory 502 is configured to store non-transitory software programs, non-transitory computer executable programs and modules, such as program instructions/modules corresponding to the voice skill creation method in the embodiment of the present disclosure (For example, the business transaction request obtaining module 410, the privacy key obtaining module 420, the business transaction request executing module 430, and the storing module 440 shown in FIG. 4). The processor 501 executes various functional applications and data processing of the server by running non-transitory software programs, instructions, and modules stored in the memory 502, that is, implementing the traffic scheme control method in the foregoing method embodiment.

The memory 502 may include a storage program area and a storage data area, where the storage program area may store an operating system and application programs required for at least one function. The storage data area may store data created according to the use of the electronic device, and the like. In addition, the memory 502 may include a high-speed random access memory, and a non-transitory memory, such as at least one magnetic disk storage device, a flash memory device, or other non-transitory solid-state storage device. In some embodiments, the memory 502 may optionally include a memory remotely disposed with respect to the processor 501, and these remote memories may be connected to the electronic device through a network. Examples of the above network include, but are not limited to, the Internet, an intranet, a local area network, a mobile communication network, and combinations thereof.

The electronic device for implementing t the privacy transaction processing method may further include: an input device 503 and an output device 504. The processor 501, the memory 502, the input device 503, and the output device 504 may be connected through a bus or in other manners. In FIG. 5, the connection through the bus is taken as an example.

The input device 503 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device 504 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

The technical solution according to the embodiments of the present disclosure may include the following beneficial effects. After determining that the business transaction request to be executed belongs to a privacy business transaction request, the blockchain nodes decrypt the privacy business transaction request by using the organization privacy key of the privacy organization to which the acquired privacy business transaction request belongs. Afterwards, the decrypted privacy business transaction request is executed to generate the privacy business transaction data including at least the associated information of the privacy content data and the privacy business transaction request, the privacy business transaction data is stored in the blockchain, and the privacy content data is stored locally. While ensuring the security of the private data content, the private data content is prevented from being tampered with. The present disclosure does not need to introduce additional transmission components. By using the organization key to encrypt the private business transaction request and upload the private business transaction request on the chain, the privacy characteristics of the data is guaranteed and the uncertainty of the transmission of the private data chain is avoided so that a low-cost, high security, and high flexibility in the implementation of privacy transactions in the blockchain network is realized.

It should be understood that various forms of processes shown above may be used to reorder, add, or delete steps. For example, the steps described in the present disclosure may be performed in parallel, sequentially, or in different orders. As long as the desired results of the technical solutions disclosed in the present disclosure can be achieved, no limitation is made herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A privacy transaction processing method, executable by blockchain nodes, comprising:
    obtaining a business transaction request to be executed;
    if the business transaction request is a privacy business transaction request, obtaining a corresponding privacy key, wherein the privacy key is an organization privacy key of a privacy organization to which the privacy business transaction request belongs;
    decrypting and executing the privacy business transaction request according to the privacy key to generate privacy business transaction data, wherein the privacy business transaction data comprises at least associated information of privacy content data and the privacy business transaction request; and
    storing the privacy business transaction data in a blockchain, and storing the privacy content data locally.

2. The method according to claim 1, wherein the associated information of the privacy content data is at least one of: a hash value obtained by performing hash operation on the privacy content data, and encrypted data obtained by encrypting the privacy content data by using the organization privacy key.

3. The method according to claim 1, wherein obtaining the corresponding privacy key comprises:
    determining whether a local node is within the privacy organization to which the privacy business transaction request belongs; and
    if the local node is within the privacy organization to which the privacy business transaction request belongs, obtaining the corresponding privacy key.

4. The method according to claim 3, wherein after determining whether the local node is within the privacy organization to which the privacy business transaction request belongs, the method further comprises:
    if the local node is not within the privacy organization to which the privacy business transaction request belongs, skipping execution on the business transaction request.

5. The method according to claim 1, further comprising:
    obtaining a transaction creation request of the privacy organization;
    generating the organization privacy key of the privacy organization according to the transaction creation request;
    encrypting the organization privacy key with public keys of nodes in the privacy organization; and
    initiating a transaction distribution request containing the encrypted organization privacy key to a blockchain network, so that each node in the privacy organization uses its own privacy key to decrypt the encrypted organization privacy key to obtain the organization privacy key.

6. The method according to claim 5, wherein obtaining the transaction creation request from the privacy organization comprises at least one of the following:
    if there is a requirement for creating privacy transaction, initiating the transaction creation request of the privacy organization; and
    based on privacy organization creation rules stored in a historical block, initiating the transaction creation request of the privacy organization.

7. The method according to claim 5, wherein after obtaining the transaction creation request of the privacy organization, the method further comprises:
- executing the transaction creation request to generate public business transaction data, wherein the public business transaction data contains at least the transaction creation request and public content data, and the public content data contains node information of the privacy organization;
- storing the public business transaction data in the blockchain; or,
- storing the transaction creation request in the blockchain, and adding the node information of the privacy organization to a local organization relation table.

8. The method according to claim 7, further comprising:
- receiving a transaction exit request of the privacy organization initiated by a node in the privacy organization; and
- executing the transaction exit request to obtain an execution result, and updating the node information in the local organization relation table according to the execution result.

9. The method according to claim 7, further comprising:
- if a node in the privacy organization is identified as a problem node, initiating a transaction deletion request of the privacy organization, so that nodes other than the node in the privacy organization delete the problem node from the local organization relation table.

10. The method according to claim 5, wherein the organization privacy key is composed of a version number and a random number.

11. The method according to claim 10, further comprising:
- if it is determined that a current state of the privacy organization meets a condition of generating a new privacy key, determining a current version number of the organization privacy key, and generating a new version number according to set numbering rules;
- based on the new version number and the random number, generating a new organization privacy key.

12. The method according to claim 11, wherein the condition of generating the new privacy key comprises at least one of:
- a current time reaching a preset privacy key update time;
- a number and/or identifiers of the nodes in the privacy organization changing, and
- the organization privacy key with the current version number suffering from a leakage event.

13. The method according to claim 5, after generating the organization privacy key of the privacy organization, further comprising:
- sending the organization privacy key to a supervision node that supervises the privacy organization, so that the supervision node supervises the privacy business transaction request in the privacy organization.

14. An electronic device, comprising:
- one or more processors;
- a memory connected in communication with the one or more processors, wherein
- the memory stores instructions executable by the one or more processors, when the instructions are executed by the one or more processors, the one or more processors are configured to:
- obtain a business transaction request to be executed;
- if the business transaction request is a privacy business transaction request, obtain a corresponding privacy key, wherein the privacy key is an organization privacy key of a privacy organization to which the privacy business transaction request belongs;
- decrypt and execute the privacy business transaction request according to the privacy key to generate privacy business transaction data, wherein the privacy business transaction data comprises at least associated information of privacy content data and the privacy business transaction request; and
- store the privacy business transaction data in a blockchain, and store the privacy content data locally.

15. The electronic device according to claim 14, wherein the associated information of the privacy content data is at least one of: a hash value obtained by performing hash operation on the privacy content data, and encrypted data obtained by encrypting the privacy content data by using the organization privacy key.

16. The electronic device according to claim 14, wherein the one or more processors are further configured to:
- determine whether a local node is within the privacy organization to which the privacy business transaction request belongs; and
- if the local node is within the privacy organization to which the privacy business transaction request belongs, obtain the corresponding privacy key.

17. The electronic device according to claim 16, wherein the one or more processors are further configured to:
- if the local node is not within the privacy organization to which the privacy business transaction request belongs, skip execution on the business transaction request.

18. The electronic device according to claim 14, wherein the one or more processors are further configured to:
- obtain a transaction creation request of the privacy organization;
- generate the organization privacy key of the privacy organization according to the transaction creation request;
- encrypt the organization privacy key with public keys of nodes in the privacy organization; and
- initiate a transaction distribution request containing the encrypted organization privacy key to a blockchain network, so that each node in the privacy organization uses its own privacy key to decrypt the encrypted organization privacy key to obtain the organization privacy key.

19. The electronic device according to claim 18, wherein the one or more processors are further configured to execute at least one of:
- if there is a requirement for creating privacy transaction, initiating the transaction creation request of the privacy organization; and
- based on privacy organization creation rules stored in a historical block, initiating the transaction creation request of the privacy organization.

20. A non-transitory computer-readable storage medium storing computer instructions, wherein when the computer instructions are executed, a computer is caused to implement a privacy transaction processing method, the method is executable by blockchain nodes and comprises:
- obtaining a business transaction request to be executed;
- if the business transaction request is a privacy business transaction request, obtaining a corresponding privacy key, wherein the privacy key is an organization privacy key of a privacy organization to which the privacy business transaction request belongs;
- decrypting and executing the privacy business transaction request according to the privacy key to generate privacy business transaction data, wherein the privacy business transaction data comprises at least associated information of privacy content data and the privacy business transaction request; and storing the privacy business transaction data in a blockchain, and storing the privacy content data locally.

* * * * *